(No Model.)
W. H. WOOD.
PITCH BOARD.
No. 433,383.　　　　　Patented July 29, 1890.
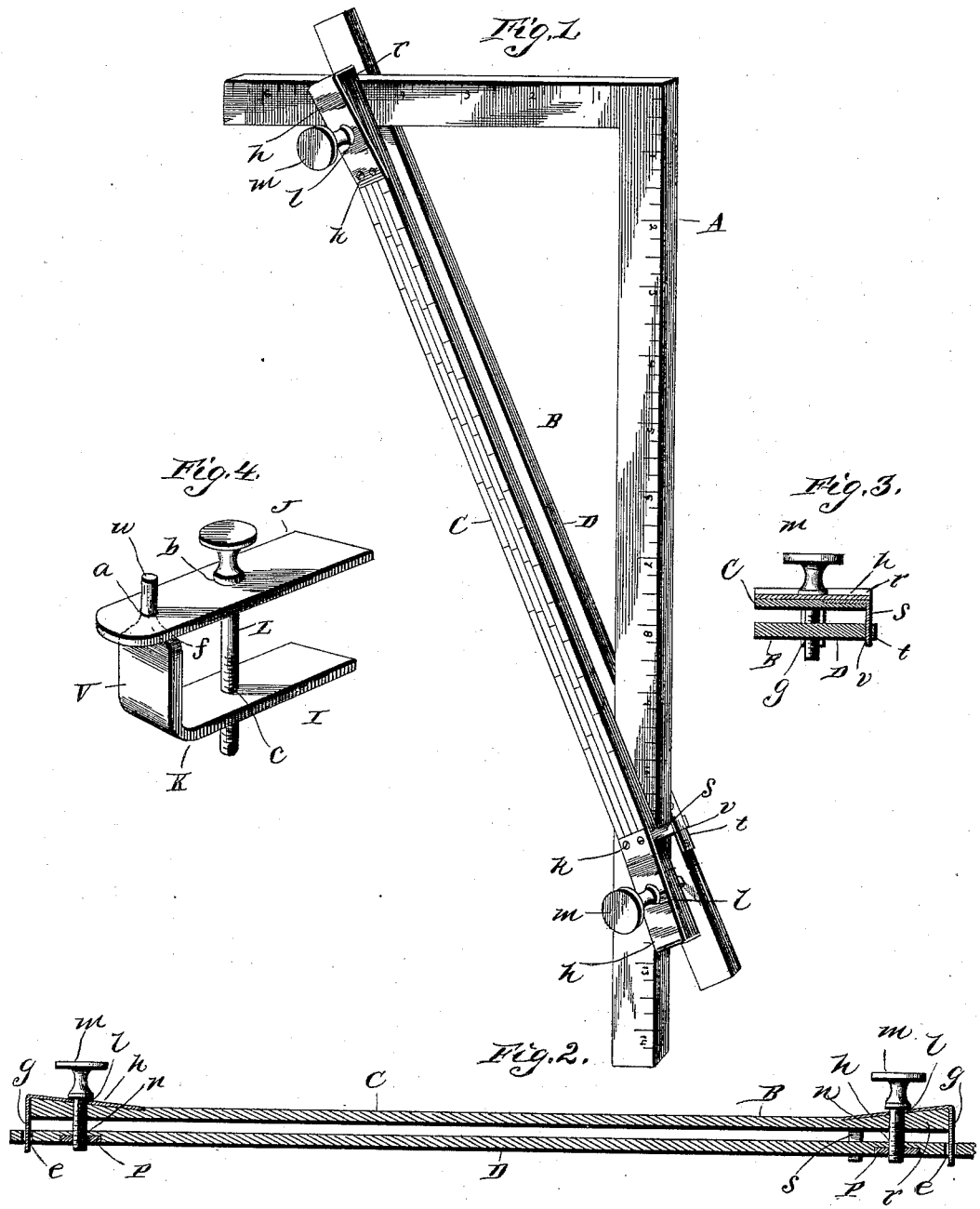

UNITED STATES PATENT OFFICE.

WILLIAM H. WOOD, OF MARYVILLE, MISSOURI.

PITCH-BOARD.

SPECIFICATION forming part of Letters Patent No. 433,383, dated July 29, 1890.

Application filed February 21, 1889. Renewed January 11, 1890. Serial No. 336,641. (No model.)

*To all whom it may concern:*

Be it known that I, WILLIAM H. WOOD, a citizen of the United States, and a resident of Maryville, in the county of Nodaway and State of Missouri, have invented certain new and useful Improvements in Brace-Measures and Try-Rule Attachments; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a top view of the invention applied to a square. Fig. 2 is a longitudinal section. Fig. 3 is a transverse section. Fig. 4 is a detail of a clamp.

This invention has relation to means for measuring braces, rafters, &c., and marking the ends and shoulders of the same; and it consists in the construction and novel combination of devices forming an attachment to any ordinary carpenter's square, all as hereinafter set forth.

In the accompanying drawings, the letter A designates a carpenter's square, and B the measuring-rule attachment.

The attachment consists of the rule or scale C and the slat D, which is usually made a little longer than the rule, so that it extends at its ends beyond the ends of the rule. At points under the ends of the rule or scale in the slat are made perforations $e$ $e$ for the passage of the guiding pins or prongs $g$ $g$, which extend downward from the angular end plates $h$ $h$, which are secured to the ends of the scale by screws $k$, and which guiding pins or prongs serve when in their apertures or perforations $e$ to aid in aligning the clamp-screws $m$ with their apertures and the indicator $s$ with its notch in assembling the parts. These plates have apertures $l$, which coincide with perforations through the rule and receive the shouldered clamp-screws $m$. In the slat D is formed near each end a perforation $n$ for the passage of the threaded end of the clamp $m$, which engages a nut P, let into the bottom of the slat, as indicated. At one end the slat is preferably rabbeted, as at $r$, so that the clamp-screw will not project below the general under surface of said slat. The edge of the scale near one end is provided with an indicator-prong $s$, which enters a notch $v$ in the side of the slat below and is braced in position by a guard-plate $t$, which is let into the side of said slat and secured thereto. This indicator-prong, which projects downward from the edge of the rule, is designed, when the scale is used, to be applied to one arm of the square at the proper point of graduation.

The attachment is applied to a carpenter's square by passing the angle of the square between the scale and slat, and after adjustment turning down the clamp-screws, so that the relation of the scale or rule to the square is rigidly preserved. Sometimes I use an additional clamp I in connection with the implement to aid the clamp-screw $m$, consisting of a straight jaw-plate J, having two perforations $a$ and $b$, and the bent jaw-plate K, having a threaded perforation $e$ to engage the clamp-screw L, and an arm V having shoulders $f$ and a prong $w$, entering the perforation $a$ in the end of the plate J.

In some cases it is designed to omit the marks of graduation on the bar C, as these marks are only required in measuring the lengths of rafters and braces, and are not needed in laying off the ends and shoulders of such beams.

Having described this invention, what I claim, and desire to secure by Letters Patent, is—

The adjustable rule and measuring attachment for carpenters' squares, consisting of the rule or scale having the angular end plates and perforations, the end guide-prongs and edge guide, the under slats having its ends extended beyond the ends of the rule, perforated near its ends for the passage of the end guides of the rule, and having the guarded edge notch the indicator-prong of said rule, the nuts and the clamp-screws passing through the perforations of said rule and slat and engaging said nuts, substantially as specified.

In testimony whereof I affix my signature in presence of two witnesses.

WM. H. WOOD.

Witnesses:
T. P. BULL,
J. G. BOATWRIGHT.